United States Patent
Meyers et al.

(10) Patent No.: US 8,805,744 B2
(45) Date of Patent: Aug. 12, 2014

(54) PODBLASTING-CONNECTING A USB PORTABLE MEDIA DEVICE TO A CONSOLE

(75) Inventors: Mark Meyers, Thousand Oaks, CA (US); Kendell T. Huntsman, Salt Lake City, UT (US); Joe Barnes, Draper, UT (US)

(73) Assignee: Disney Enterprises, Inc., Burbank, CA (US)

( * ) Notice: Subject to any disclaimer, the term of this patent is extended or adjusted under 35 U.S.C. 154(b) by 1436 days.

(21) Appl. No.: 12/175,690

(22) Filed: Jul. 18, 2008

(65) Prior Publication Data

US 2009/0088255 A1 Apr. 2, 2009

Related U.S. Application Data

(60) Provisional application No. 60/976,678, filed on Oct. 1, 2007.

(51) Int. Cl.
*G06Q 99/00* (2006.01)
*A63F 13/00* (2014.01)

(52) U.S. Cl.
CPC ........... *A63F 13/00* (2013.01); *A63F 2300/206* (2013.01); *A63F 2300/404* (2013.01); *A63F 2300/6018* (2013.01); *A63F 2300/8047* (2013.01); *G06Q 2220/18* (2013.01)
USPC ................. 705/59; 463/35; 84/609; 715/716; 715/723

(58) Field of Classification Search
USPC .......... 705/59; 463/35; 84/609; 715/716, 723
See application file for complete search history.

(56) References Cited

U.S. PATENT DOCUMENTS

| | | | | |
|---|---|---|---|---|
| 5,553,864 | A * | 9/1996 | Sitrick | 463/31 |
| 7,078,609 | B2 * | 7/2006 | Georges | 84/645 |
| 7,627,903 | B2 * | 12/2009 | Kamperman et al. | 726/27 |
| 8,006,186 | B2 * | 8/2011 | Kellock et al. | 715/728 |
| 2002/0156911 | A1 * | 10/2002 | Croman et al. | 709/235 |
| 2003/0018968 | A1 * | 1/2003 | Avnet | 725/32 |
| 2004/0027369 | A1 * | 2/2004 | Kellock et al. | 345/716 |
| 2004/0143603 | A1 * | 7/2004 | Kaufmann et al. | 707/104.1 |

(Continued)

FOREIGN PATENT DOCUMENTS

WO WO 2007/076346 A1 7/2007

OTHER PUBLICATIONS

PCT Search Report for PCT Application No. PCT/US2008/072202, mailed on Oct. 27, 2008; 3 pages.

(Continued)

*Primary Examiner* — James D Nigh
(74) *Attorney, Agent, or Firm* — Kilpatrick Townsend & Stockton LLP

(57) ABSTRACT

Embodiments of the present invention provide techniques for aiding users of game consoles in creating custom gameplay data for a music video game based on audio data (e.g., songs) stored on a portable media device. Specific embodiments provide a game console application that can receive a song at a game console from a portable media device, and receive user inputs to generate custom gameplay data associated with the song. The gameplay data may then be saved to the portable media device and later accessed, either at the same or a different game console, to allow a user to play the music video game in accordance with the gameplay data and the audio data. In this manner, users can create and share custom gameplay content for a music video game based on songs stored on their portable media devices.

30 Claims, 8 Drawing Sheets

(56) References Cited

U.S. PATENT DOCUMENTS

| | | |
|---|---|---|
| 2005/0198221 A1* | 9/2005 | Manchester et al. .......... 709/220 |
| 2006/0059426 A1* | 3/2006 | Ogikubo ....................... 715/723 |
| 2007/0055932 A1* | 3/2007 | Glein et al. ................... 715/526 |
| 2007/0124491 A1* | 5/2007 | Hawkins et al. .............. 709/231 |
| 2007/0136679 A1* | 6/2007 | Yang ............................. 715/772 |
| 2007/0162979 A1* | 7/2007 | Kamperman et al. .......... 726/27 |
| 2007/0163427 A1* | 7/2007 | Rigopulos et al. .............. 84/609 |
| 2007/0191102 A1* | 8/2007 | Coliz et al. ...................... 463/42 |
| 2008/0156178 A1* | 7/2008 | Georges et al. ................. 84/645 |

OTHER PUBLICATIONS

Written Opinion for PCT Application No. PCT/US2008/072202, mailed on Oct. 27, 2008; 8 pages.

\* cited by examiner

PODBLASTING-CONNECTING A USB PORTABLE MEDIA DEVICE TO A CONSOLE

CROSS-REFERENCES TO RELATED APPLICATIONS

The present application claims the benefit and priority under 35 U.S.C. 119(e) from U.S. Provisional Application No. 60/976,678 filed Oct. 1, 2007 entitled PODBLASTING-CONNECTING A USB PORTABLE MEDIA DEVICE TO A CONSOLE, the entire contents of which are herein incorporated by reference for all purposes.

BACKGROUND OF THE INVENTION

Embodiments of the present invention relate to video games, and more particularly relate to techniques for aiding users of game consoles in creating custom gameplay data for a video game based on audio data stored on a portable media device.

In recent years, console-based "music" (or "rhythm") video games such as "Dance Dance Revolution," BeatMania," "Guitar Hero," and the like have grown tremendously in popularity. A music video game is a type of game that challenges players to enter inputs in accordance with gameplay cues, or markers, that are designated for a song in the game's musical soundtrack. The gameplay cues are typically synchronized with one or more aural components of the song, such as the underlying beat or the notes played by an instrument. Thus, the gameplay of a music video game is generally oriented around a player's ability to enter inputs "in time" with the game's music. In some games, the gameplay cues are represented by visual indicators that aid the player in recognizing when to enter an input, and what the input should be.

Since a music video game generally requires gameplay cues (i.e., gameplay data) to be defined for each playable song in its soundtrack, currently available music video games are limited to including a predefined number of songs. For example, the game "Guitar Hero" for the Sony PlayStation 2 game console includes 47 total playable songs in its soundtrack. This limitation can be problematic if, for example, only a small percentage of the songs included in a music video game appeal to a particular game player.

One possible solution to the above limitation is for game developers to simply provide a greater number of playable songs for their music video games, either as part of the games themselves, or as part of later-produced sequels or "expansion packs." For example, Guitar Hero II, the sequel to Guitar Hero, includes an additional 40 songs not found in the original. However, this approach may be problematic for several reasons. First, given the broad range of musical tastes that people have and the relatively limited storage capacity of game media, it is possible that an expanded song list will still include only a handful of songs that appeal to each game player. Second, creating gameplay data for a large number of songs may be time-consuming, thereby undesirably extending the development cycle of a game. Third, acquiring licensing rights for a large number of songs from the composers and/or original performers may be prohibitively expensive. Fourth, in the case of a sequel or expansion pack, consumers may be unwilling to pay an additional cost for what may be perceived as a "rehash" of the original game.

BRIEF SUMMARY OF THE INVENTION

Embodiments of the present invention address the foregoing and other such problems by providing techniques for aiding users of game consoles in creating custom gameplay data for a music video game based on audio data (e.g., songs) stored on a portable media device. Specific embodiments provide a game console application that can receive a song at a game console from a portable media device, and receive user inputs to generate custom gameplay data associated with the song. The gameplay data may then be saved to the portable media device and later accessed, either at the same or a different game console, to allow a user to play the music video game in accordance with the gameplay data and the audio data. In this manner, users can create and share custom gameplay content for a music video game based on songs stored on their portable media devices. In one embodiment, the game console application may include an interface for controlling the portable media device from the game console. In further embodiments, the game console application may generate a video of a user playing the music video game in accordance with the custom gameplay data and the song, and store the video on the portable media device.

In one set of embodiments, a technique for aiding a user of a game console in creating gameplay data for a video game based on audio data stored on a portable media device comprises receiving the audio data at the game console from the portable media device, the portable media device being communicatively coupled with the game console via a data link. The technique further comprises presenting a user interface to the user of the game console, the user interface including a visual representation of the audio data, and receiving input from the user of the game console, the input being used to generate gameplay data associated with the audio data. In various embodiments, the generated gameplay data includes a plurality of user input cues synchronized with the audio data. The generated gameplay data is then stored on the portable media device.

In another set of embodiments, the technique above further comprises receiving the gameplay data at the game console from the portable media device, and enabling a user of the game console to play the video game in accordance with the gameplay data and the audio data. Enabling a user to play the video game may include playing back the audio data while concurrently displaying a visual representation of the gameplay data. In one embodiment, the video game is a music video game.

In another set of embodiments, the technique above further comprises determining whether a user of a second game console is allowed to access the gameplay data created by the user of the first game console. This may depend, for example, on whether the user of the second game console owns a legally acquired copy of the song associated with the gameplay data. If the user of the second game console is allowed to access the gameplay data, the gameplay data is received at the second game console and the user of the second game console is enabled to play the video game on the second game console in accordance with the gameplay data and the audio data.

In another set of embodiments, the technique above further comprises generating a video of a user of a game console playing a game in accordance with the gameplay data and the audio data, and storing the video on the portable media device. The video may then be viewed by connecting the portable media device to a game console and displaying the video on a display connected to the game console, or displaying the video on a display of the portable media device.

In another set of embodiments, the technique above further comprises receiving information about a plurality of audio tracks from the portable media device, where the plurality of audio tracks are stored on the portable media device, and where the audio data is included in the plurality of audio tracks. A second user interface is presented to the user of the game console, the second user interface including at least a portion of the information about the plurality of audio tracks. A selection of the audio data from among the plurality of audio tracks is then received from the user of the game console. In various embodiments, the selection is received via a motion-sensitive controller.

In one set of embodiments, a system for aiding a user of a game console in creating gameplay data for a video game based on audio data stored on portable media device is disclosed. The system includes a first programmatic interface for receiving the audio data at the game console from the portable media device, an editor module for displaying a visual representation of the audio data and receiving input from the user of the game console, the input being used to generate gameplay data associated with the audio data, and a second programmatic interface for transmitting the gameplay data from the game console to the portable media device for storage on the portable media device. In various embodiments, the system further includes a third programmatic interface for receiving the gameplay data at the game console, and a playback module for playing back the audio data while concurrently displaying a visual representation of the gameplay data within a video game, thereby allowing the user of the game console to play the video game in accordance with the gameplay data and the audio data.

In one set of embodiments, a computer program product stored on a machine-readable medium is disclosed. The computer program product includes code for receiving audio data at a game console from a portable media device, the portable media device being communicatively coupled with the game console via a data link. The computer program product further includes code for presenting a user interface to the user of the game console, the user interface including a visual representation of the audio data, receiving input from the user of the game console, the input being used to generate gameplay data associated with the audio data, and storing the generated gameplay data on the portable media device. In various embodiments, the generated gameplay data includes a plurality of user input cues synchronized with the audio data.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention provide techniques for aiding users of game consoles in creating custom gameplay data for a video game based on audio data stored on a portable media device (e.g., Apple iPod, Apple iPhone, Sony PSP, Microsoft Zune, etc.). Specific embodiments are directed (but not limited) to music video games, in which gameplay data is typically associated with audio tracks such as songs. The techniques of the present invention enable a user of a game console to connect a portable media device to a game console, receive audio data at the console, create custom gameplay data associated with the audio data, and save the custom gameplay data to the portable media device. The custom gameplay data may then be accessed, either at the same game console or a different game console, to enable a user to play a music video game in accordance with the custom gameplay data and the associated audio data. In this manner, users can play a music video game using songs from their own personal music collection, without being limited to the song selection included in the game.

Figure 1:
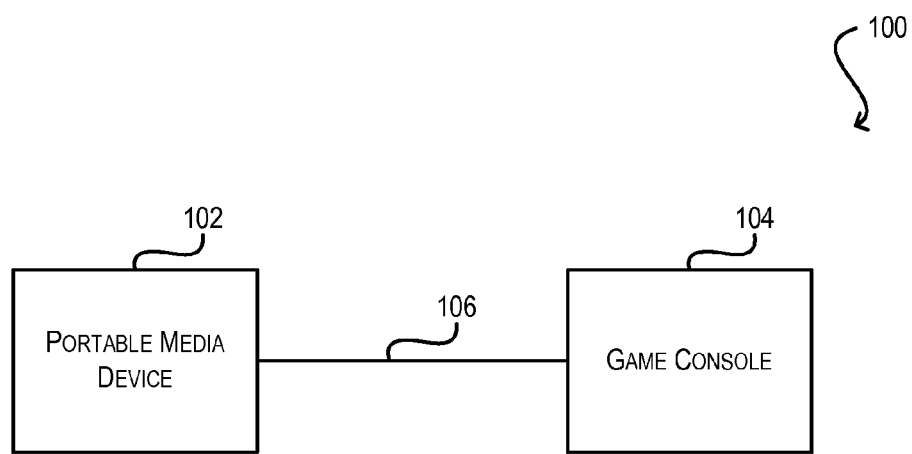
FIG. 1 is a simplified block diagram of a system for transferring data from a portable media device to a game console, and vice versa, in accordance with an embodiment of the present invention.

FIG. 1 is a simplified block diagram of system for transferring data from a portable media device to a game console, and vice versa, according to an embodiment of the present invention. As shown, system 100 includes a portable media device 102 communicatively coupled to a game console 104 via a data link 106. As used herein, a "portable media device" is any portable device that is capable of storing media (e.g., music files, video files, image files, etc.) in a non-volatile memory (e.g., hard disk, flash memory, etc.) resident in the device, and playing back the media from the non-volatile memory. For instance, a portable media device may be, without limitation, a music playback device, a cellular phone, a movie playback device, a video game device, a personal digital assistant (PDA), or any combination of the above. Examples of commercially available portable media devices include the Apple iPod, Apple iPhone, Sony PSP, Microsoft Zune, and the like.

Game console 104 is any device capable of executing a computer or video game. In one embodiment, game console 104 is a dedicated game playing device, such as a Nintendo Wii, Sony PlayStation 2, Sony PlayStation 3, Microsoft Xbox 360, and the like. In other embodiments, game console 104 may be a multifunction device that is capable of playing games, such as a personal computer, cable box, digital video recorder (e.g., TiVo), media center/extender (e.g., Apple TV), and the like. The structure of an exemplary game console is discussed in greater detail with respect to FIG. 2 below.

Portable media device 102 may communicate with game console 104 using data link 106. Data link 106 may be a wired (e.g., Universal Serial Bus (USB), Firewire, optical, etc.) or a wireless (e.g., RF, 802.11, Bluetooth, infrared, etc.) link. Further, various different communications protocols may be used to communicate a data stream over data link 106, including both standardized (e.g., USB, TCP/IP, Bluetooth, etc.) and proprietary protocols. For example, a standardized protocol such as USB may be used for wire-level data transmission via data link 106, and a proprietary protocol such as the Apple iPod Communications protocol may be used for application-level data transmission via data link 106. One of ordinary skill in the art would recognize many variations, modifications, and alternatives.

Although only a single portable media device 102 and game console 104 are shown in FIG. 1, it should be appreciated that system 100 may incorporate any number of these devices. For example, multiple portable media devices 102 may be communicatively coupled to a single game console 104. Conversely, a single portable media device 102 may communicatively coupled to multiple game consoles 104. Furthermore, each connection between a portable media device and a game console may utilize a different type of data link (e.g., wired, wireless, etc.).

Figure 2:
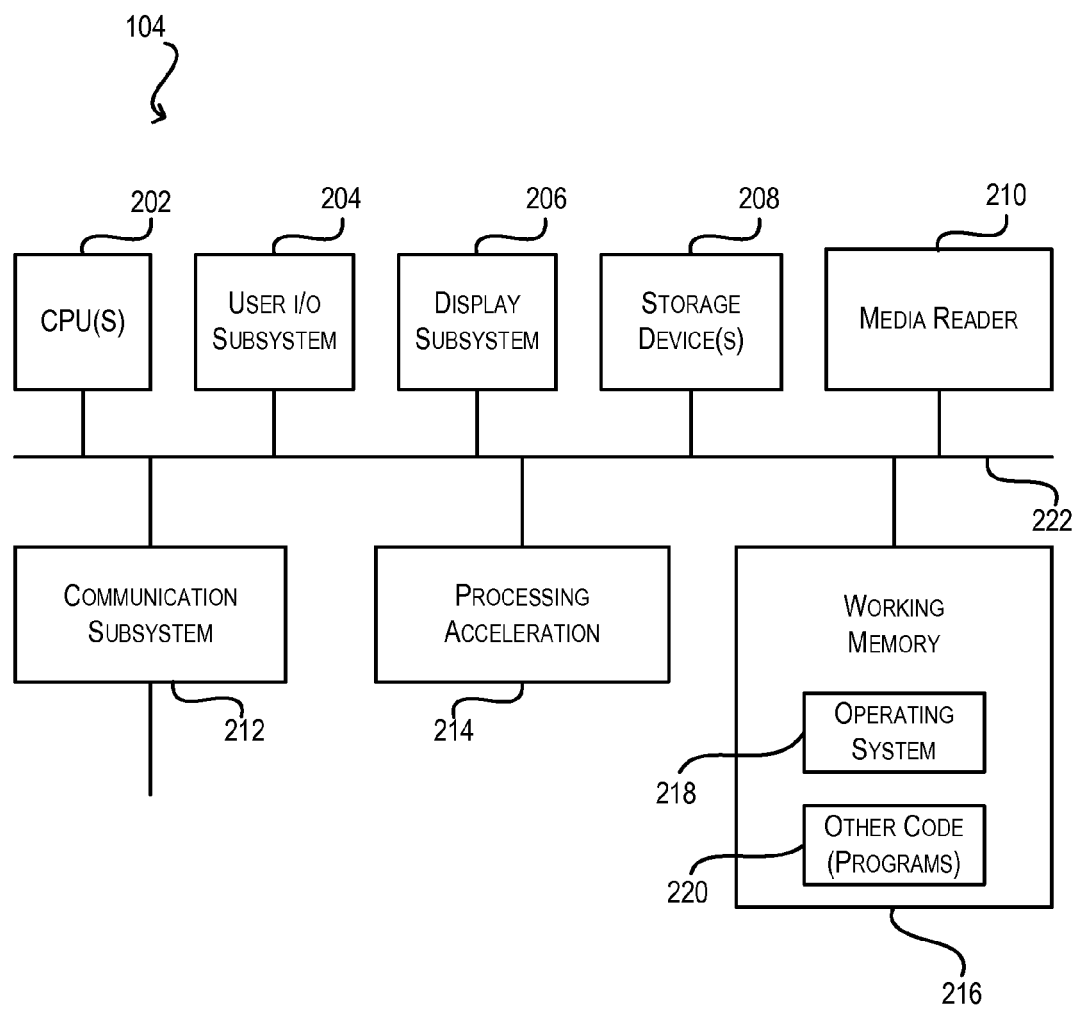
FIG. 2 is a simplified block diagram of a game console that may be used in accordance with an embodiment of the present invention.

FIG. 2 is a simplified block diagram of a game console 104 that may be used in accordance with an embodiment of the present invention. In various embodiments, game console 104 of FIG. 2 corresponds to game console 104 of FIG. 1, and thus may be used to receive data from, and transmit data to, portable media device 102 via data link 106. As shown in FIG. 2, game console 104 comprises hardware elements that may be coupled via one or more electrical buses 222. The hardware elements may include one or more central processing units (CPUs) 202, a user input/output subsystem 204 (for controlling a game controller, a mouse, a keyboard, etc.), and a display subsystem 206 (for controlling a display device such as an LCD, plasma, CRT, etc.). Game console 104 may also include one or more storage devices 208. By way of example, the storage device(s) 208 may include devices such as hard disk drives and solid-state storage devices such as a random access memory ("RAM") and/or a read-only memory ("ROM"), which can be programmable, flash-updateable and/or the like.

In various embodiments, game console 104 may additionally include a media reader 210 (e.g., cartridge slot, optical disk drive, etc.) and a communications subsystem 212 (e.g., a modem, a network interface (wireless or wired), an infra-red communication device, a peripheral interface (wireless or wired), etc.). Media reader 210 is generally configured to read game data from a computer-readable storage medium such as a DVD, CD, ROM cartridge, and the like. In specific embodiments, communication subsystem 212 may comprise one or more interfaces (e.g., USB, Firewire, 802.11, Bluetooth, RF, etc.) for communicatively coupling portable media device 102 to game console 104 via data link 106 as depicted in FIG. 1.

Game console 104 may further include a working memory 216, which may include RAM and ROM devices as described above. In some embodiments, game console 104 may optionally include a processing acceleration unit 214, which can include a digital signal processor (DSP), a graphics acceleration processor, a physics acceleration processor, and/or the like.

Figure 4:
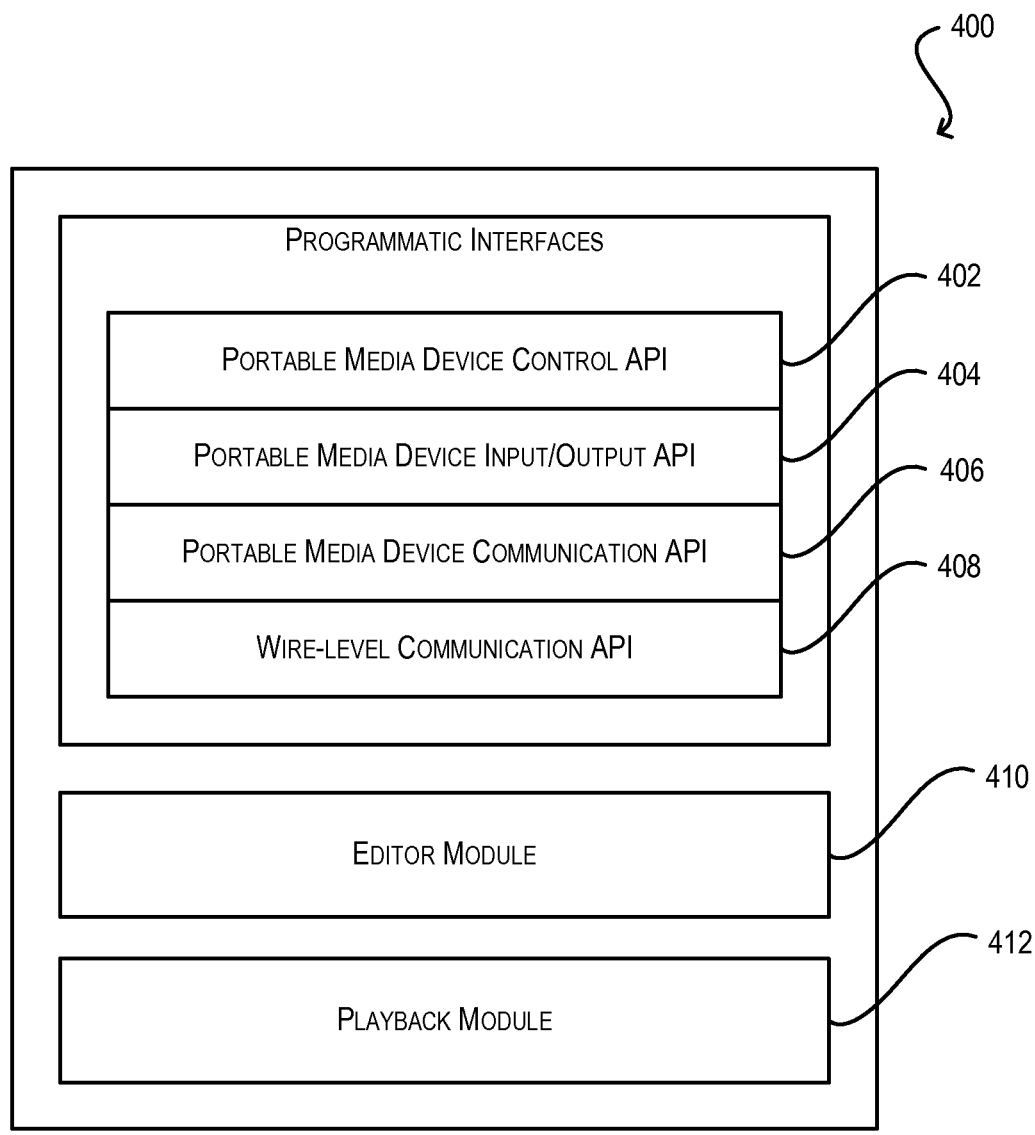
FIG. 4 is a simplified block diagram of an exemplary game console application in accordance with an embodiment of the present invention.

Game console 104 may also comprise software elements, shown as being currently located within working memory 216, including an operating system 218 and/or other code 220. In one set of embodiments, other code 220 comprises application programs such as a video game program and/or a game console application for creating custom gameplay data from audio data stored on a portable media device as illustrated in FIG. 4. It should be appreciated that alternate embodiments of game console 104 may have numerous variations from that described above. For example, customized hardware might also be used and/or particular elements might be implemented in hardware, software, or both. Further, connection to other computing devices and peripheral devices may be employed. One of ordinary skill in the art would recognize many variations, modifications, and alternatives.

Figure 3A:
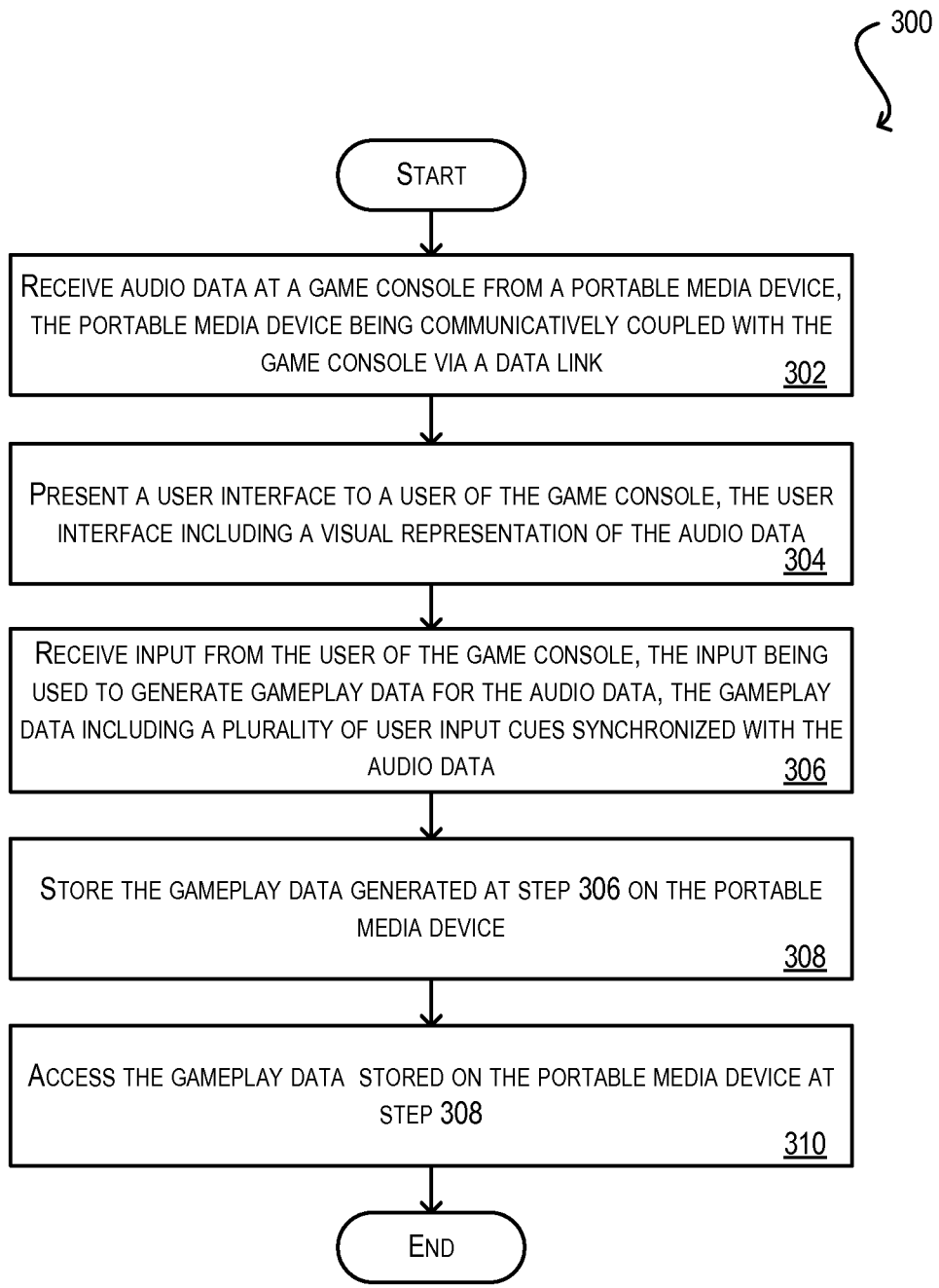
FIGS. 3A, 3B, and 3C illustrate the steps performed in aiding a user of a game console in creating gameplay data for a video game based on audio data stored on a portable media device in accordance with an embodiment of the present invention.
Figure 3B:
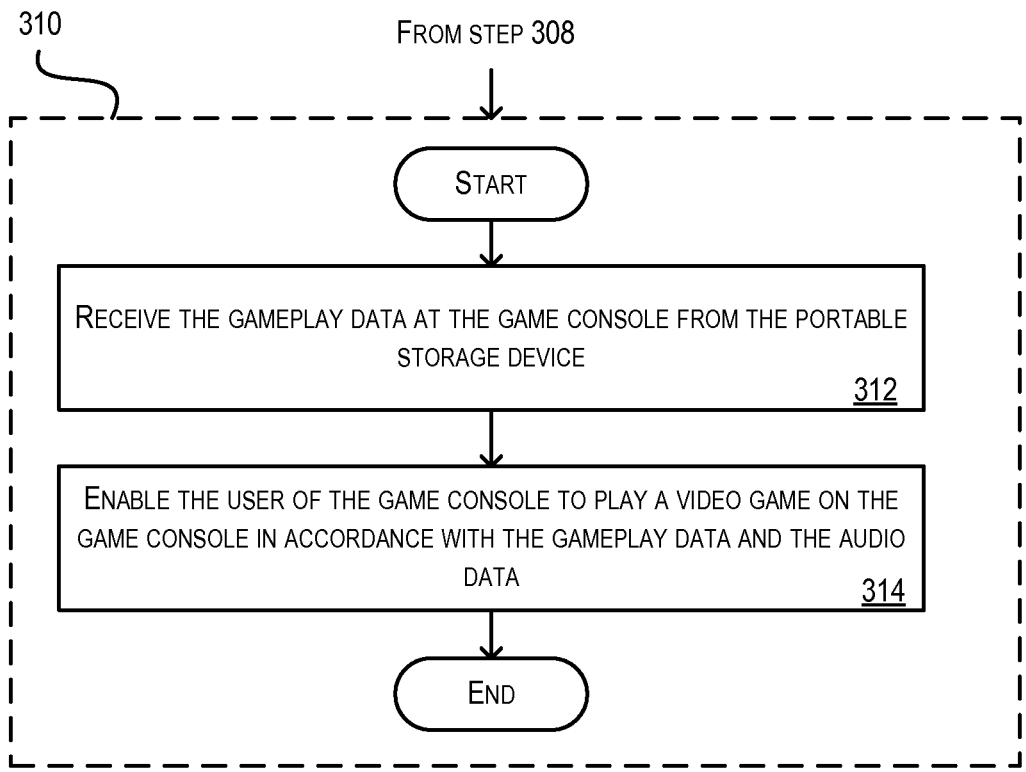
Figure 3C:
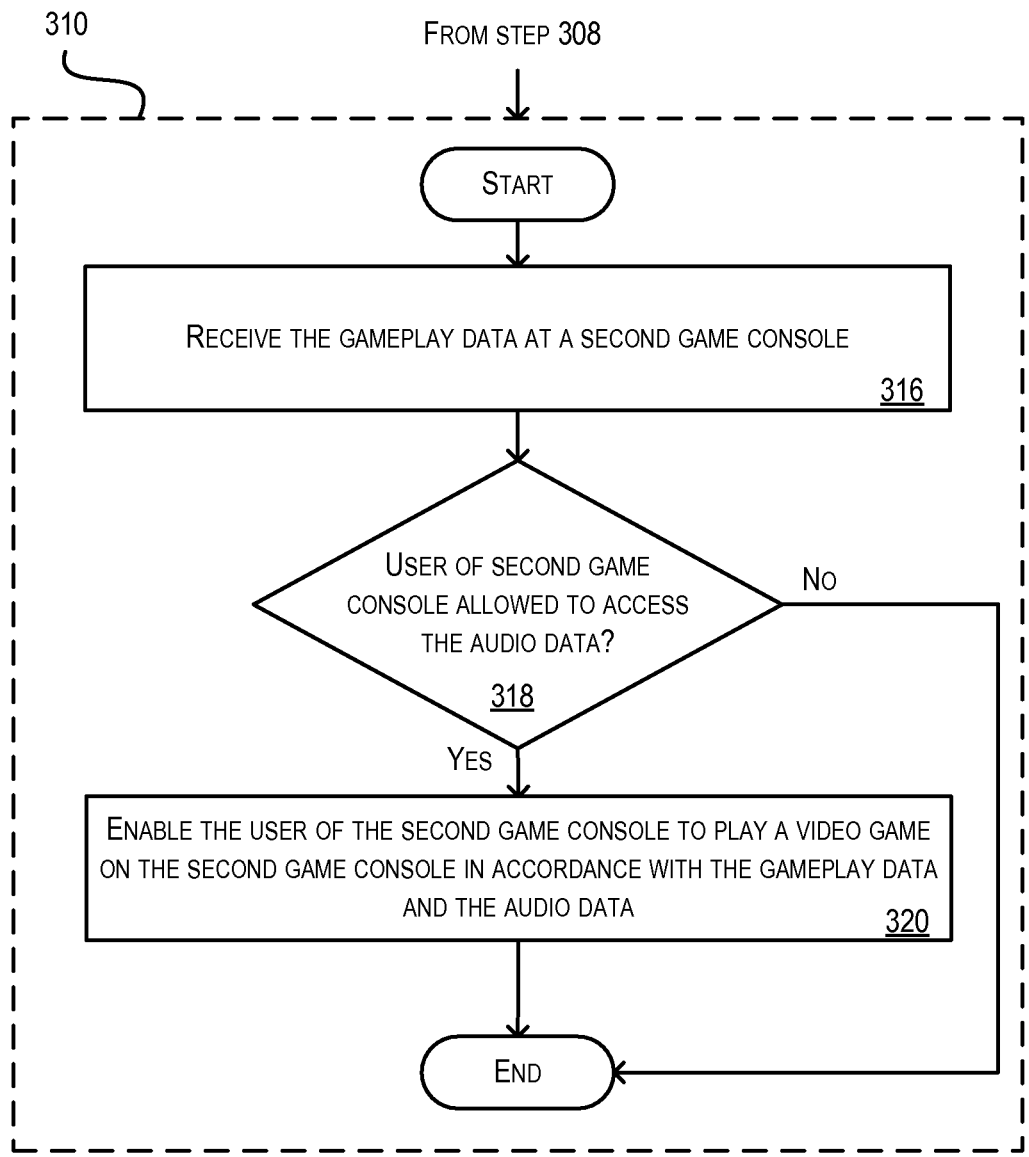

FIGS. 3A, 3B, and 3C depict a flowchart 300 of a method for aiding a user of a game console in creating gameplay data for a video game based on audio data stored on a portable media device in accordance with an embodiment of the present invention. The processing depicted in FIGS. 3A, 3B, and 3C may be performed by software modules executed by a processor (such as CPU 202 of FIG. 2), hardware modules, or combinations thereof. The software modules may be stored on a computer-readable medium. The method depicted in FIGS. 3A, 3B, and 3C are merely illustrative of an embodiment of the present invention and is not intended to limit the scope of the present invention. Other variations, modifications, and alternatives are also within the scope of the present invention. In one embodiment, method 300 is performed by a game console, such as game console 104 of FIGS. 1 and 2.

At step 302, audio data is received at a game console from a portable media device. In various embodiments, the audio data is received via a data link between the game console and the portable media device, such as data link 106 of FIG. 1. As described with respect to FIG. 1, the data link may be a wired (e.g., USB, Firewire, optical, etc.) or wireless (e.g., RF, 802.11., Bluetooth, infrared, etc.) link. The audio data may be encoded in any type of format, such as MP3, AAC, WAV, Apple Lossless, and the like, and may represent any type of audio information, such as a song, speech, sound effects, and the like. In one embodiment, the audio data is transferred from the portable media device to the game console in a streaming format, such that the audio data is decoded by the portable media device and received at the game console as a raw bitstream. In other embodiments, the audio data is transferred from the portable media device to the game console in its original encoded format. In these embodiments, the audio data may be stored on the game console and decoded by the game console.

Once the audio data has been received at the game console, a user interface is presented to a user of the game console, where the user interface includes a visual representation of the audio data (step 304). In various embodiments, the user interface is generated by the game console, and is configured to allow the user to create custom gameplay data for the audio data received from the portable media device. In one embodiment, the audio data is visually presented in the user interface as a timeline. The user interface may also include a mechanism for aurally playing back the content of the audio data.

At step 306, one or more inputs are received from the user of the game console, where the inputs are used to generate gameplay data associated with audio data. The generated gameplay data may later be used to play a video game (such as a music video game) in accordance with the gameplay data and the associated audio data. In one embodiment, the inputs received from the user may be entered via a motion sensitive controller, such as the motion sensitive remote included with the Nintendo Wii game console. Alternatively, the inputs received from the user may be entered via standard game controller, or any other type of input device such as a keyboard, mouse, and the like.

In various embodiments, the gameplay data generated in step 306 includes a plurality of user input (i.e., gameplay) cues that are synchronized with the audio data. For example, the gameplay data may include gameplay cues indicating that a specific input (e.g., a button press on a game controller) should be entered for each note played by a particular instrument in the audio data. In one embodiment, the user of a game console may create multiple instances of gameplay data for a single audio data track. For instance, the user may select an instrument in the audio data that they would like to define gameplay data for, and then enter inputs to generate gameplay data for the selected instrument. Such instruments may include, without limitation, guitar, bass, keyboard, drums, voice (lead singer), sound effects, and the like.

At step 308, the gameplay data generated at step 306 is transmitted to the portable media device for storage therein. The gameplay data may be stored in any type of data format, such as Extensible Markup Language (XML), plain text, binary, and the like. Further, the gameplay data may be stored in one or more files that are separate from the associated audio data, or in the same file as the associated audio data. For example, the gameplay data may be stored as metadata in the associated audio data file. If the gameplay data is stored in one or more files that are separate from the associated audio data, the gameplay data file(s) may include an identifier to correlate the gameplay data file(s) with the associated audio data file.

In various embodiments, the gameplay data stored on the portable media device at step 308 may be accessed to allow a game player to play a video game in accordance with the gameplay data and the associated audio data (step 310). In one embodiment, as illustrated in FIG. 3B, the gameplay data may be received from the portable media device at the same game console where it was created (step 312). Once the gameplay data is received, a user of the game console is enabled to play a video game in accordance with the gameplay data and the associated audio data (step 314). Enabling a user to play a video game in accordance with the gameplay data and the associated audio data may comprise allowing a user to select the gameplay data and the associated audio data from within the context of the video game. The video game may then play back the audio data while concurrently displaying a visual representation of the gameplay data, thereby allowing the user to "play" the game by listening to the audio data and entering inputs in accordance with the gameplay data. If a plurality of gameplay data files were created for a single audio data track, the user may be allowed to select one or more of the plurality of gameplay data files for playback within the context of the video game. For example, the user may select a both a guitar gameplay data file and a keyboard gameplay data file for a song. The user (and optionally another user) may then play the video game in accordance with both the guitar gameplay data and the keyboard gameplay data.

In another embodiment, as illustrated in FIG. 3C, the gameplay data may be received at a second game console that is different from the game console where it was created (step 316). In this case, the game console determines whether a user of the second game console is allowed to access the audio data associated with the gameplay data (step 318). This determination may be made, for example, by checking whether the user of the second console owns a legally acquired copy of the audio data. If the user of the second console is allowed to access the audio data, the user of the second game console is enabled to play a video game on the second game console in accordance with the gameplay data and the audio data (step 320).

In one embodiment, the gameplay data received at the second game console may be received from the portable media device. For example, the user of the second game console may connect the portable media device to the second game console via a data link (such as data link 106 of FIG. 1) and initiate a transfer of the gameplay data (and optionally, the audio data) to the second game console through the data link. In alternative embodiments, the gameplay data may be received from another source. For example, the gameplay data stored on the portable media device may, in some embodiments, be uploaded to a remote server. In this case, the gameplay data may be received at the second game console from the remote server rather than the portable media device.

It should be appreciated that the specific steps illustrated in FIGS. 3A, 3B, and 3C provide a particular method for aiding a user of a game console in creating gameplay data for a video game based on audio data stored on a portable media device according to an embodiment of the present invention. Other sequences of steps may also be performed according to alternative embodiments. For example, alternative embodiments of the present invention may perform the steps outlined above in a different order. Moreover, the individual steps illustrated FIG. 3A, 3B, or 3C may include multiple sub-steps that may be performed in various sequences as appropriate to the individual step. Furthermore, additional steps may be added or removed depending on the particular applications. One of ordinary skill in the art would recognize many variations, modifications, and alternatives.

In one set of embodiments, the steps illustrated in FIGS. 3A, 3B, and 3B may be carried out by a application running on game console 104 of FIGS. 1 and 2. FIG. 4 is a simplified block diagram of such an application in accordance with these embodiments. As shown, application 400 includes one or more programmatic interfaces 402, 404, 406, 408, an editor module 410, and a playback module 412. Programmatic interfaces 402, 404, 406, 408 are generally used to enable the transmission of data (such as audio data and gameplay data) between portable media device 102 and game console 104 of FIG. 1. The programmatic interfaces may include a wire-level communication application programming interface (API) 408 for facilitating communication with the input/output hardware (e.g., USB controllers) of media device 102 and game console 104. The programmatic interfaces may also include portable media device communication (406) and input/output (404) APIs for transmitting data between portable media device 102 and game console 104 at the application-level. In one embodiment, application 400 may also employ a portable media device control API (402) to control the operation of the portable media device from the game console. This functionality is discussed in greater detail with respect to FIG. 5 below.

Editor module 410 is configured to enable a user of a game console to create gameplay data based on audio data in accordance with method 300 of FIG. 3A. In various embodiments, editor module may include a mechanism for the user to select an audio data track stored on a portable media device, a user interface for displaying the audio data in a visual format to the user, a mechanism for receiving user inputs, a mechanism for generating gameplay data associated with the audio data, and a mechanism for storing the generated gameplay data on the portable media device.

In some embodiments, application 400 may further include a playback module 412. Playback module 412 is configured to enable a user of a game console to play a video game (such as a music video game) using custom gameplay data in accordance with FIGS. 3B and 3C. For example, playback module 412 may include a mechanism for enabling the user to select gameplay data from the portable media device (or some other source), determining whether the user is allowed to access the audio data associated with the gameplay data, and a mechanism for enabling the user to play the video game in accordance with the selected gameplay data and its associated audio data.

As shown in FIG. 4, components 402, 404, 406, 408, 410, 412 are part of a single integrated application 400. However, components 402, 404, 406, 408, 410, 412 may be separated into two or more distinct applications/modules. For example, programmatic interfaces 402, 404, 406, 408 may be a distinct module that is permanently stored in a storage device (e.g., flash ROM) of game console 104, whereas editor and playback modules 410, 412 are stored with the code for a video game on a computer-readable storage medium that is loaded into working memory from media reader 210 of FIG. 2. In other embodiments, programmatic interfaces 402, 404, 406, 408 and editor module 410 may be stored on a first computer-readable storage medium, and playback module 412 may be stored with the code for a video game on a second computer-readable storage medium. In yet other embodiments, components 402, 404, 406, 408, 410, 412 may all be stored with the code for a video game on a single computer-readable storage medium. One of ordinary skill in the art would recognize many variations, modifications, and alternatives.

Figure 5:
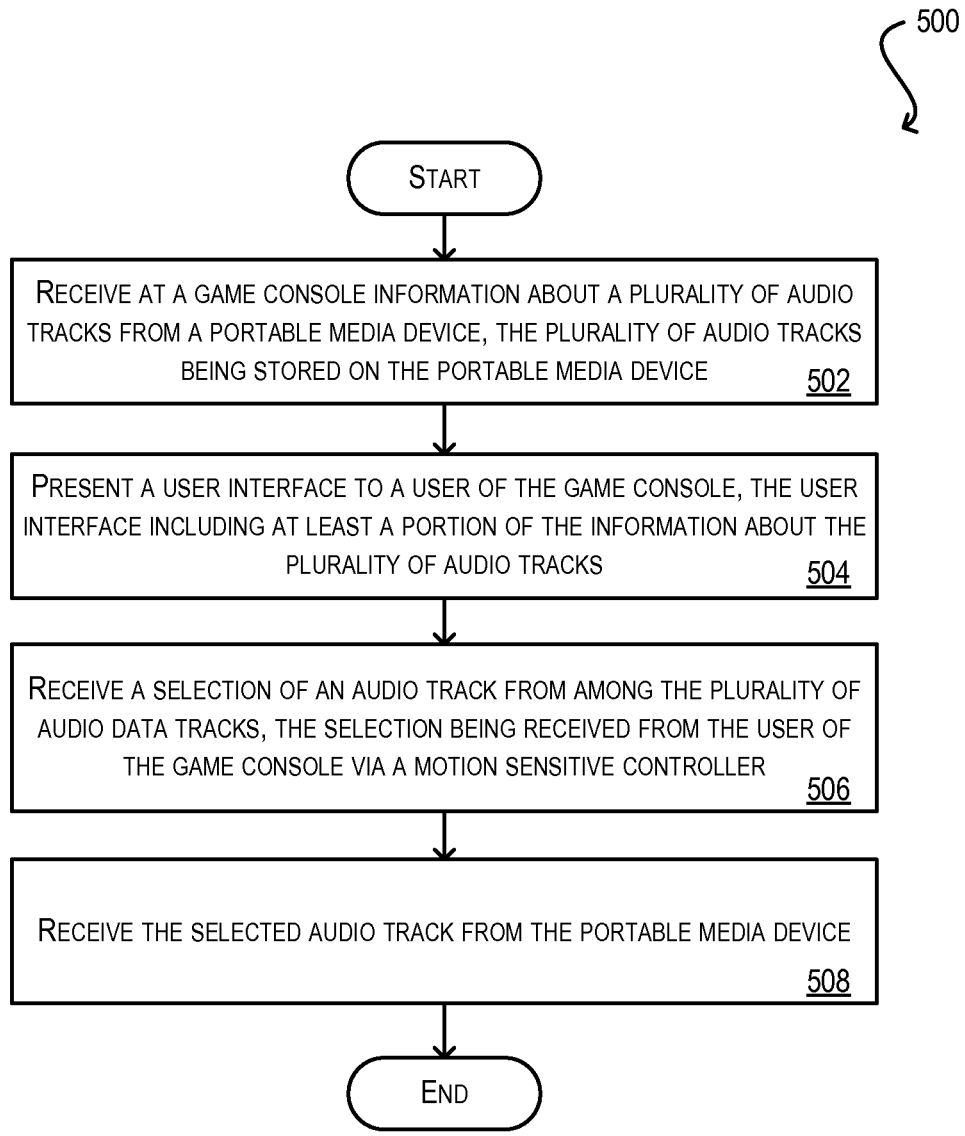
FIG. 5 illustrates the steps performed in controlling a portable media device from a game console in accordance with an embodiment of the present invention.

In various embodiments, game console 104 may be used to control the operation of portable media device 102, thereby allowing a user of the game console to select an audio data track stored on the portable media device from the context of a user interface of the game console, rather than a user interface of the portable media device. FIG. 5 illustrates one method 500 for controlling a portable media device from a game console in accordance with an embodiment of the present invention. At step 502, information is received at a game console about a plurality of audio tracks from a portable media device, where the plurality of audio tracks are stored on the portable media device. The information about the plurality of audio tracks may include title data, album data, artist data, and the like.

At step 504, the user interface is presented to a user of the game console, the user interface including at least a portion of the information about the plurality of audio tracks. In an exemplary embodiment, the user interface presented at step 504 is configured to closely match the user interface presented to a user of the portable media device. For example, if the portable media device is an Apple iPod, the user interface generated by the game console would be configured to look like the iPod interface.

Once the user interface is presented to the user, the game console may be configured to receive a selection of an audio track (e.g., audio data) from among the plurality of audio tracks through the user interface (step 506). In one embodiment, the selection may be received from the user via a motion sensitive controller, such as the Nintendo Wii remote. In other embodiments, the selection may be received via a standard game controller, or any other type of input device.

At step 508, the selected audio track (e.g., audio data) is received at the game console from the portable media device. As described previously, the audio data may be received in a streaming format such that the audio data is decoded by the portable media device and transmitted to the game console as a raw bitstream. This may be useful if the audio data is protected by a digital rights management (DRM) scheme, and the DRM key is tied to the portable media device. Alternatively, the audio data may be transferred to the game console in its original encoded format and decoded by the game console. Once the audio data is received at the game console, gameplay data for the audio data may be generated in accordance with method 300 of FIG. 3A.

It should be appreciated that the specific steps illustrated in FIG. 5 provide a particular method for controlling a portable media device from a game console according to an embodiment of the present invention. Other sequences of steps may also be performed according to alternative embodiments. For example, alternative embodiments of the present invention may perform the steps outlined above in a different order. Moreover, the individual steps illustrated FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
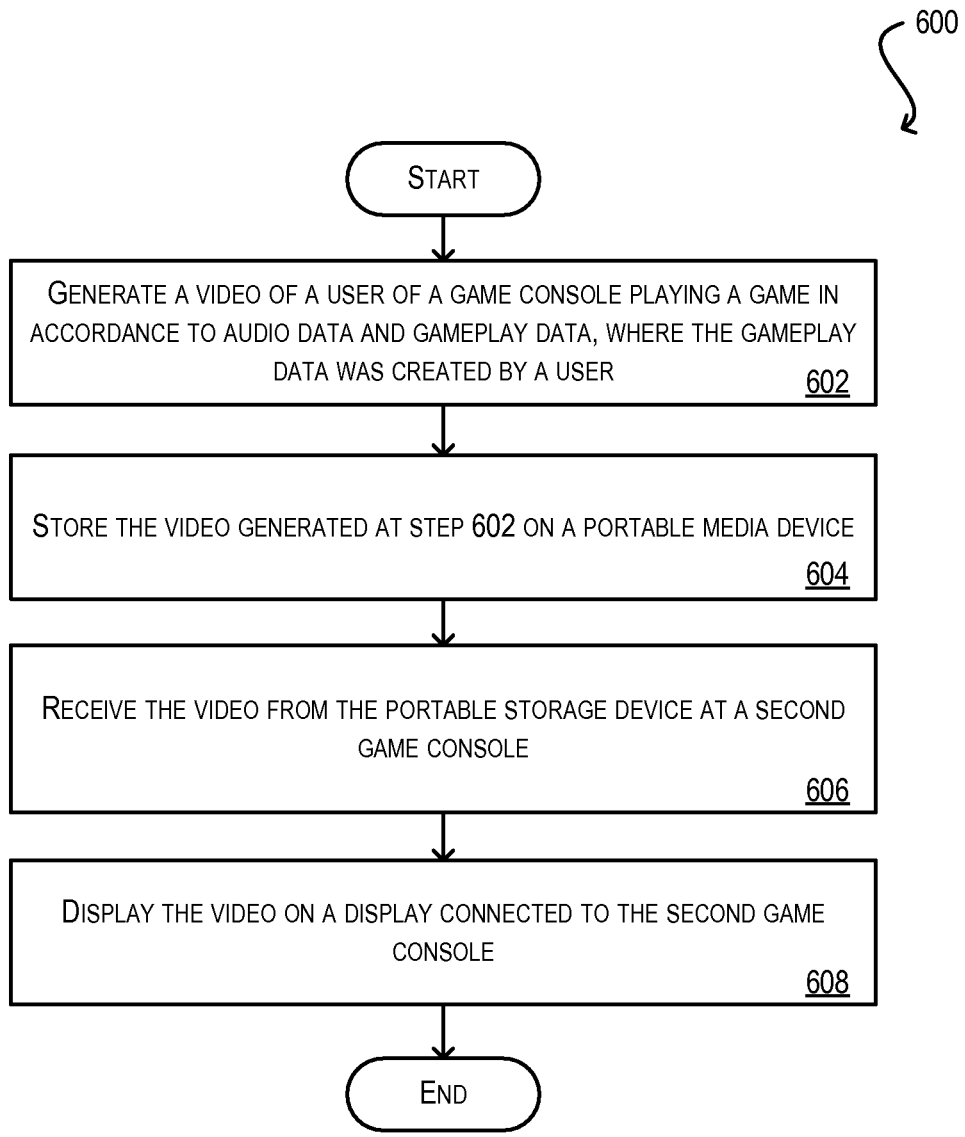
FIG. 6 illustrates the steps performed in generating and storing a video of user gameplay on a portable media device in accordance with an embodiment of the present invention.

According to one embodiment of the present invention, a user of a game console may be enabled to create a performance video (i.e., video file such as an MPEG, AVI, MOV, etc.) of the user playing a video game in accordance with custom gameplay data and associated audio data, and then s hare the performance video with others. As shown in FIG. 6, this technique (600) may include generating a video of the user playing a video game in accordance with user-defined gameplay data and associated audio data (step 602). For example, the gameplay data may have been generated by a game console according to method 300 of FIG. 3A. At step 604, the generated video is stored on a portable media device. In one embodiment, the video may then be received from the portable media device at a second game console, and displayed on a display connected to the second game console (steps 606, 608). In other embodiments, the video may be viewed directly on a display of the portable media device. In this manner, the user may capture and share his or her performance of playing a video game in accordance with custom gameplay data and associated audio data.

It should be appreciated that the specific steps illustrated in FIG. 6 provide a particular method for generating and storing a video of user gameplay on a portable media device according to an embodiment of the present invention. Other sequences of steps may also be performed according to alternative embodiments. For example, alternative embodiments of the present invention may perform the steps outlined above in a different order. Moreover, the individual steps illustrated FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Although specific embodiments of the invention have been described, various modifications, alterations, alternative constructions, and equivalents are also encompassed within the scope of the invention. For example, the described invention is not restricted to operation with certain types of games or game playing devices, but is free to operate with a plurality of different game types or game playing devices. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
receiving, by a game console, audio data from an audio file stored on a portable media device, the portable media device being communicatively coupled with the game console via a data link;
presenting, by the game console, a user interface to a user of the game console, the user interface including a timeline of the audio data;
receiving, by the game console, input from the user via the user interface, the input defining gameplay data associated with the audio data, the gameplay data including a plurality of user input cues synchronized with the audio data; and
storing, by the game console, the gameplay data as metadata associated with the audio file on the portable media device.

2. The method of claim 1 further comprising:
receiving the gameplay data at the game console from the portable media device; and
enabling the user of the game console to play the video game on the game console in accordance with the gameplay data and the audio data.

3. The method of claim 2 wherein enabling the user of the game console to play the video game on the game console in accordance with the gameplay data and the audio data comprises playing back the audio data while concurrently displaying a visual representation of the gameplay data.

4. The method of claim 3 wherein the video game is a music video game.

5. The method of claim 2 further comprising:
determining if a user of a second game console is allowed to access the audio data; and
if the user of the second game console is allowed to access the audio data:
receiving the gameplay data at the second game console; and
enabling the user of the second game console to play the video game on the second game console in accordance with the gameplay data and the audio data.

6. The method of claim 5 wherein the user of the second console is allowed to access the audio data if the user of the second console owns a legally acquired copy of the audio data.

7. The method of claim 5 wherein receiving the gameplay data at the second game console comprises:
communicatively coupling the portable media device with the second game console via a second data link; and
receiving the gameplay data from the portable media device through the second data link.

8. The method of claim 5 wherein receiving the gameplay data at the second game console comprises downloading the gameplay data from a remote server.

9. The method of claim 2 further comprising:
generating a video of the user of the game console playing the video game in accordance with the gameplay data and the audio data; and
storing the video on the portable media device.

10. The method of claim 9 further comprising displaying the video on a display of the portable media device.

11. The method of claim 9 further comprising:
receiving the video from the portable media device at a second game console; and
displaying the video on a display connected to the second game console.

12. The method of claim 1 further comprising:
receiving information about a plurality of audio tracks from the portable media device, the plurality of audio tracks being stored on the portable media device, the audio data being included in the plurality of audio tracks; and
presenting a second user interface to the user of the game console, the second user interface including at least a portion of the information about the plurality of audio tracks.

13. The method of claim 12 further comprising receiving a selection of the audio data from among the plurality of audio tracks, the selection being received from the user of the game console via a motion-sensitive controller.

14. The method of claim 1 further comprising uploading the gameplay data to a remote server.

15. The method of claim 1 wherein the input is received from the user of the game console via a motion-sensitive controller.

16. The method of claim 1 wherein one or more user input cues in the gameplay data correspond to notes played by one or more instruments in the audio data.

17. The method of claim 16 wherein the one or more instruments is selected from a group consisting of: guitar, bass, keyboard, drums, and voice.

18. The method of claim 1 further comprising storing the audio data on the game console.

19. The method of claim 1 wherein the audio data is received at the game console in a streaming format.

20. The method of claim 1 wherein the gameplay data is stored on the portable media device in Extensible Markup Language (XML) format.

21. The method of claim 19 wherein the audio data file is an Advanced Audio Code (AAC) file.

22. The method of claim 1 where the gameplay data is stored on the portable media device as a first file and the audio data is stored on the portable media device as a second file.

23. The method of claim 1 wherein the data link is a wired link.

24. The method of claim 23 where the data link is a Universal Serial Bus (USB) link.

25. The method of claim 1 where in the data link is a wireless link.

26. The method of claim 1 wherein the input received from the user via the user interface includes:
a selection of a musical instrument represented in the audio data; and
definitions of gameplay cues indicating that a specific input should be entered for each note played by the musical instrument in the audio data.

27. The method of claim 1 wherein the user interface further includes a mechanism for aurally playing back the audio data.

28. A system comprising:
a processor configured to:
receive audio data from an audio file stored on a portable media device;
display a user interface including a timeline of the audio data;
receive input from a user via the user interface, the input defining gameplay data associated with the audio data, the gameplay data including a plurality of user input cues synchronized with the audio data; and
transmit the gameplay data to the portable media device for storage on the portable media device, the gameplay data being stored as metadata associated with the audio file.

29. The system of claim 28 wherein the processor is further configured to:
- receive the gameplay data at the game console from the portable media device; and
- play back the audio data while concurrently displaying a visual representation of the gameplay data within a game, thereby allowing the user to play a video game in accordance with the gameplay data and the audio data.

30. A non-transitory machine-readable medium having stored thereon a series of instructions which, when executed by a processor, cause the processor to:
- receive audio data at a game console from an audio file stored on a portable media device, the portable media device being communicatively coupled with the game console via a data link;
- present a user interface to a user of the game console, the user interface including a visual timeline of the audio data;
- receive input from the user of the game console via the user interface, the input defining gameplay data associated with the audio data, the gameplay data including a plurality of user input cues synchronized with the audio data; and
- store the gameplay data as metadata associated with the audio file on the portable media device.

* * * * *